United States Patent [19]
Taylor et al.

[11] Patent Number: 5,351,888
[45] Date of Patent: Oct. 4, 1994

[54] MULTI-AXIS VECTORABLE EXHAUST NOZZLE

[75] Inventors: John B. Taylor; Dudley O. Nash, both of Cincinnati, Ohio

[73] Assignee: General Electric Company, Cincinnati, Ohio

[21] Appl. No.: 61,398

[22] Filed: May 14, 1993

[51] Int. Cl.⁵ .................. B64D 33/08; B05B 1/12
[52] U.S. Cl. .................. 239/127.3; 239/265.35; 239/265.41; 60/232
[58] Field of Search .................. 239/265.33–265.41; 60/229, 232

[56] References Cited

U.S. PATENT DOCUMENTS

| | | |
|---|---|---|
| 2,831,319 | 4/1958 | Geary .................. 239/265.37 |
| 2,984,068 | 5/1961 | Eatock .................. 239/265.41 X |
| 3,098,352 | 7/1963 | Taub et al. .................. 239/265.37 X |
| 3,140,584 | 7/1964 | Ritchey et al. . |
| 3,361,362 | 1/1968 | Edwards . |
| 3,416,754 | 12/1968 | Pinaire et al. . |
| 3,424,382 | 1/1969 | Pinaire . |
| 3,659,789 | 5/1972 | Schultz . |
| 3,979,067 | 9/1976 | Nash . |
| 4,000,854 | 1/1977 | Konarski et al. . |
| 4,026,472 | 5/1977 | Rabone .................. 239/265.41 X |
| 4,104,877 | 8/1978 | Bone et al. . |
| 4,181,260 | 1/1980 | Nash . |
| 4,280,660 | 7/1981 | Wooten, Jr. et al. . |
| 4,508,270 | 4/1985 | Joubert . |
| 4,575,099 | 3/1986 | Nash .................. 239/265.37 X |
| 4,984,741 | 1/1991 | Nightingale . |
| 4,993,641 | 2/1991 | Kehret et al. .................. 60/232 X |
| 4,994,660 | 2/1991 | Hauer . |
| 5,050,803 | 9/1991 | Wakeman et al. . |
| 5,076,496 | 12/1991 | Lippmeier . |
| 5,082,182 | 1/1992 | Bruchez, Jr. et al. . |
| 5,176,323 | 1/1993 | Nash .................. 239/265.39 X |

FOREIGN PATENT DOCUMENTS

| | | | |
|---|---|---|---|
| 1035146 | 7/1966 | United Kingdom | .......... 239/265.33 |
| 2063189 | 6/1981 | United Kingdom | .......... 239/265.35 |

*Primary Examiner*—Andres Kashnikow
*Assistant Examiner*—Kevin P. Weldon
*Attorney, Agent, or Firm*—Jerome C. Squillaro; Nathan D. Herkamp

[57] ABSTRACT

A convergent-divergent exhaust nozzle is mounted to an exhaust duct of a jet aircraft engine by a circumferentially-spaced set of hydraulic cylinders. The cylinders are interconnected in captured flow via hydraulic circuits which allow the cylinders to function as a gimbal mounting. This mounting allows the entire nozzle to vector the exhaust without additionally loading the divergent flaps with vectored exhaust so that cool, low pressure ram air can be channeled directly to the divergent flaps for efficient cooling.

16 Claims, 12 Drawing Sheets

MULTI-AXIS VECTORABLE EXHAUST NOZZLE

BACKGROUND OF THE INVENTION

1. Field of the Invention

The present invention relates in general to aircraft gas turbine engines requiring jet exhaust vectoring in all directions for enhanced aircraft maneuverability and pertains especially to such engines requiring temperature suppression if exhaust nozzle flowpath surfaces.

2. Description of Prior Developments

Fighter aircraft must be highly maneuverable to survive attack by modern tracking missiles and sophisticated anti-aircraft defense systems. Current fighter aircraft maneuverability is limited by the excess available power of the engine and the maximum angle of attack that the wings can sustain without experiencing buffet and stall. In-flight thrust vectoring by the engine exhaust system can alleviate these conditions and thereby improve the maneuverability and survivability of an aircraft fighter.

Many types of thrust vectoring nozzles have been studied during the past 20 years. Thrust vectoring generally falls into two categories covering two basic approaches. The first category is divergent vectoring, wherein the jet exhaust is deflected by actuation of the divergent nozzle flaps so as to deflect the jet exhaust while the convergent nozzle accelerates the flow continuously in an axial, nonvectored direction. The second category is primary vectoring, which varies the orientation of the entire exhaust nozzle so that the exhaust flow is accelerated at a desired vector angle.

The major advantages of divergent vectoring are minimum transverse excursion during vectoring and low weight. A limitation of this concept is the difficulty in providing adequate divergent nozzle flowpath cooling due to high divergent wall gas pressures. The exhaust gas which flows against the divergent nozzle flowpath surfaces during thrust vectoring generates high impact pressures which must be overcome by highly pressurized bypass cooling air flowing through the flowpath surfaces and into the exhaust gas flowstream.

An important advantage of primary vectoring is the relatively low divergent wall gas pressures and uniform circumferential gas pressure distribution which exists since the flaps do not deflect the flow in vectoring. This allows for not only simple low pressure air cooling of the flow path surfaces but, in addition, for more effective temperature suppression of the exhaust nozzle. Improved temperature control can be provided by the introduction of low pressure and low temperature ram air through cooling slots provided along the full length of the divergent flowpath surface. A limitation of primary vectoring has been excessive exhaust nozzle weight.

A common primary vectoring approach for accomplishing the required multi-directional pivoting of the exhaust nozzle uses a pair of gimbal rings which function much the same as the gimbal system commonly used for mounting navigation compasses. Although these gimbal rings are very effective in providing the kinematic needs of nozzle vectoring, the extremely high loads applied to the gimbal rings by the exhaust nozzle impose a large weight impact on the thrust vectoring system. The axial and transverse forces applied by the exhaust gas to the exhaust nozzle during vectoring are high, for example, on the order of approximately 40,000 lbs. and 7,000 lbs., respectively.

While these forces are easily handled when distributed on a conventional exhaust duct, when they are concentrated in two orthogonally related gimbal rings, the flexing and twisting moments on the rings together with the local reinforcement required for concentrating and redistributing the loads results in an excessive added structural weight requirement. The additional weight required to provide vectoring capability using the gimbal ring approach can reach 40% to 60% of the basil nozzle weight. Moreover, in some cases, gimbal designs have had to be eliminated because of the nonacceptable deformations of the gimbal rings.

Gimbal rings, when designed to handle the applied loads, are not only heavy but they also tend to exceed the aircraft contours at the interface between the nozzle and the aircraft fairing, wing or body. This is a serious aerodynamic drawback since any significant deviation in the preferred contours leads to increased afterbody drag with attendant reduction in aircraft range.

In addition to reacting the transverse force applied on the exhaust duct by the primary vectoring nozzle, the greater axial force must be reacted in a manner which is consistent with the pivoting action of the nozzle, which is low in friction and which is low in weight. An alternative design is therefore required which will essentially perform the function of the previously used gimbal rings but at a much lower weight, at a high vectoring rate and without exceeding the preferred aerodynamic contours at the interface between the nozzle and the aircraft.

Accordingly, a need exists for a vectorable nozzle which requires much less added weight than nozzles which incorporate gimbal rings and which is compatible with the low drag aircraft contours at the nozzle-fairing interface. Such a nozzle should be capable of effective temperature suppression of the nozzle flowpath surfaces and require minimum transverse excursion during vectoring for aircraft installation compatibility.

A further need exists for such a nozzle which has a high vectoring rate capability and exhibits high reliability and safety. Still another need exists for such a nozzle which uses low pressure ram air for cooling the nozzle flaps, particularly the divergent flaps of a convergent-divergent nozzle.

SUMMARY OF THE INVENTION

The present invention has been developed to fulfill the needs noted above and therefore has as an object the provision of a vectorable exhaust nozzle of the primary vectoring type which avoids the use of conventional gimbal rings. Exhaust flow turning is achieved by rotating or pivoting the entire nozzle with a swiveling motion so as to provide uniform, relatively low divergent nozzle gas pressures. This allows highly effective cooling of the entire nozzle flowpath using cool, low penalty, low pressure bypass ram air.

A set of hydraulic cylinders is arranged to provide a gimbaled mounting to the entire exhaust nozzle without resorting to the use of conventional gimbal rings. The hydraulic cylinders provide a better load distribution than that possible with gimbal rings and thereby enable the use of a lower weight nozzle mounting which can provide a high nozzle vectoring rate.

Additional weight savings are achieved by mounting the nozzle area actuators for the convergent and divergent nozzle flaps directly on the flaps. This actuator mounting also allows for a reduction in both the length of the pivoting nozzle as well as its transverse excursion.

Should actuation force Me lost with the hydraulically supported nozzle in a vectored position, it will return to the cruise position under the combined action of the unbalanced pressure load on the convergent nozzle and the external air loading. This is assured by the negligible friction in the hydraulic gimbal system and the fact that the friction on a transverse load bearing mounted between the movable nozzle and static exhaust duct tends to zero with the restoring forces as the vector angle tends to zero. The nozzle vectoring function is thus virtually failsafe.

High reliability is assured since vector angle control is independent of nozzle area control. This is achieved with a pair of separate vectoring actuators. With independent vectoring control, simple, reliable control of this vital aircraft flight control function is provided.

Advantages of the present invention which are particularly pertinent to two-dimensional nozzles include gimbal vectoring of the entire nozzle as compared to the conventional method of vectoring by divergent flaps only. This provides all direction, two-dimensional vectoring. The resulting reduced gas pressures on the divergent flaps can permit cooling without the added weight of heat liners on the divergent flaps as required with divergent vectoring.

The present invention also provides better flowpath temperature suppression capability. Moreover, since the two-dimensional nozzle side walls vector with the flaps, side wall height can be reduced with attendant weight and drag benefits. Since the side walls can be supported by cross tie members, further weight savings can be obtained while limiting deflection of the side walls.

The rectangular or two-dimensional nozzle discharge area can be varied by actuators located on each side wall for rigid, flutter resistant flap support. Transverse excursion during vectoring is minimized and installation compatibility is thus enhanced by use of a contoured convergent flap construction.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

Figure 1:
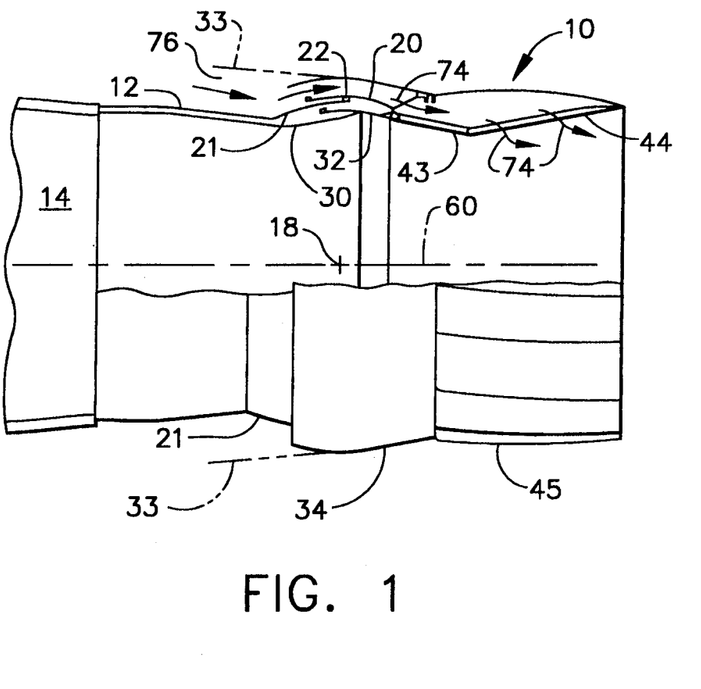
FIG. 1 is a schematic view in partial axial section of a multi-axis, vectorable exhaust nozzle positioned at zero vector in accordance with the present invention.
Figure 2:
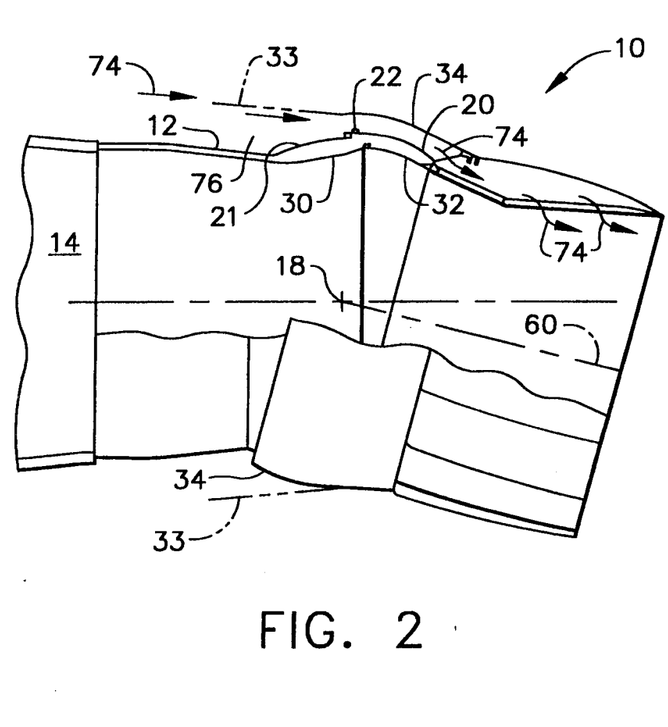
FIG. 2 is a view of the nozzle of FIG. 1 positioned at a 15° downward vector angle.
Figure 4:
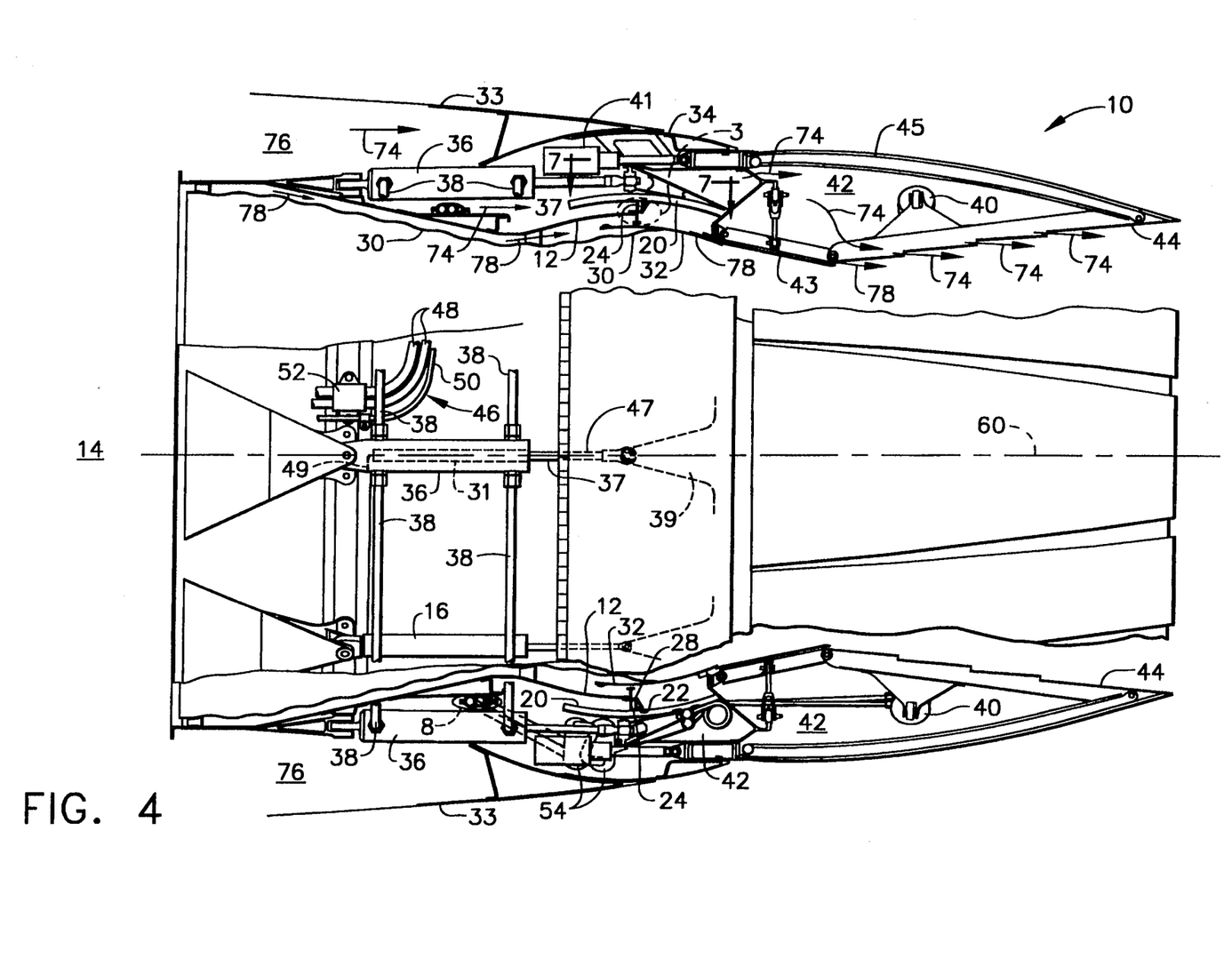
FIG. 4 is a detailed view of FIG. 1 showing the nozzle in a nonvectored position.
Figure 5:
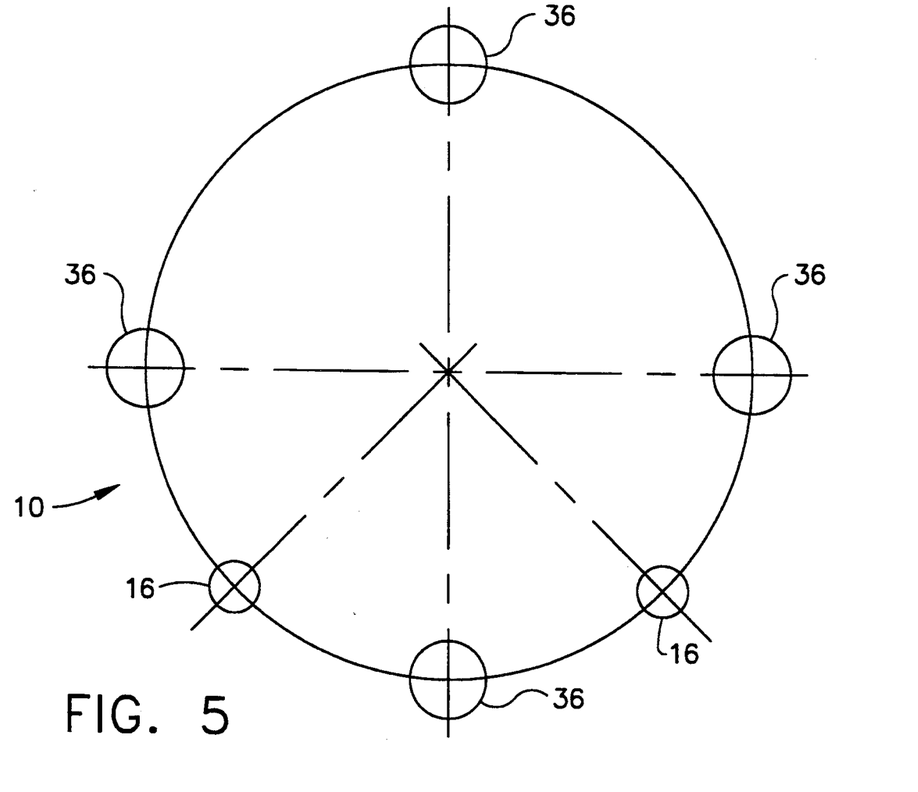
FIG. 5 is a schematic view showing the circumferential spacing between the hydraulic cylinders and the pitch and yaw actuators.

The present invention will now be described in conjunction with the drawings, beginning with FIGS. 1 and 2, which show an exhaust nozzle assembly 10 mounted to the exhaust duct 12 of an aircraft jet engine 14. Multi-axis or all-direction exhaust vectoring is accomplished by pivoting or swiveling the entire nozzle assembly 10 with respect to jet engine exhaust duct 12. As best seen in FIGS. 4 and 5, pivoting is effected by two hydraulic pitch and yaw actuators 16 positioned circumferentially 90° apart so that, in combination, they can rotate the nozzle assembly 10 in any direction about pivot point 18 (FIGS. 1 and 2).

Figure 3:
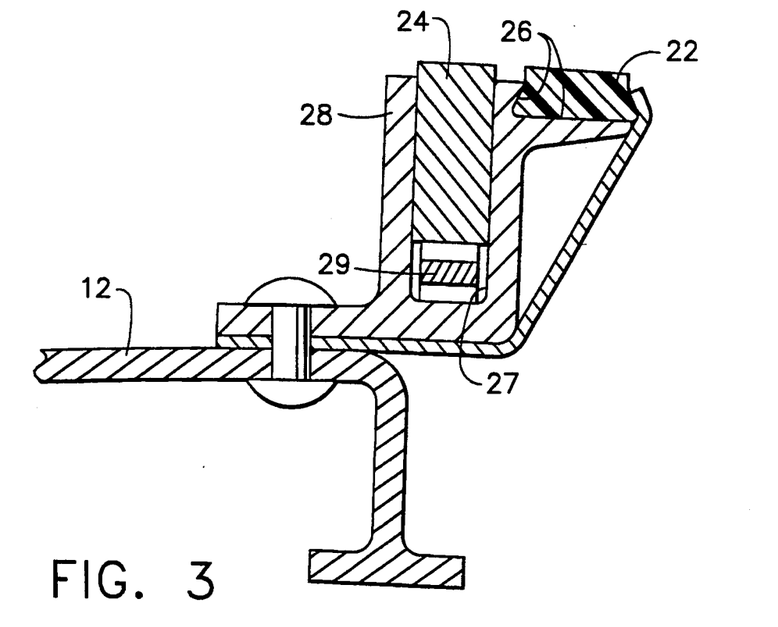
FIG. 3 is an enlarged sectional view as taken from section 3 of FIG. 4 showing a bearing and seal assembly extending between a spherical end portion of the engine exhaust duct and a spherical end portion of the exhaust nozzle.

Pivot point 18 is located at the center of spherical shell 20 which is fixed to the nozzle assembly 10 for sliding engagement with a circumferential bearing 22 which is fixed to the engine exhaust duct 12 as shown in FIGS. 3 and 4. During vectoring, the transverse aircraft maneuvering forces produced by the vectored nozzle assembly are delivered via the spherical shell 20 to the bearing 22 and to spherical end portion 21 of exhaust duct casing 12 and finally to the aircraft by way of conventional engine mounts which mount the engine to the aircraft.

For achieving low friction during vectoring, bearing 22 is formed of a nonmetallic material such as carbon or polyamide. As best seen in FIG. 3, adjacent to bearing 22 is a circumferential carbon ring seal 24 which is of the piston ring type so as to mate well with the spherical shell 20. Carbon ring seal 24 effectively limits gas leakage between the nozzle assembly 10 and exhaust duct 12.

Both bearing 22 and seal 24 are mounted within circumferential channels 26,27 respectively formed within support ring 28 which is attached to exhaust duct 12. An annular spring 29 may be mounted within channel 27 to bias the carbon ring seal 24 radially inwardly into biased contact with spherical shell 20.

Referring to FIG. 4, a liner or heat shield 30 commonly used in augmented turbofan engines is configured to accommodate the vectoring motion of a movable spherical flange 32 in much the same manner as the nozzle assembly 10 and exhaust duct 12. A close sliding contact may be maintained between the aft free end of the liner 30 and the inner spherical surface of flange 32.

A major feature of the invention is the ability to maintain a smooth, continuous aerodynamic profile between aircraft fairing 33 and outer flap seals 34 without increasing the cross section along this interface. This smooth annular junction is made possible by the elimination of bulky gimbal rings and the use of the hydraulically mounted nozzle assembly 10 as detailed below.

Figure 6:
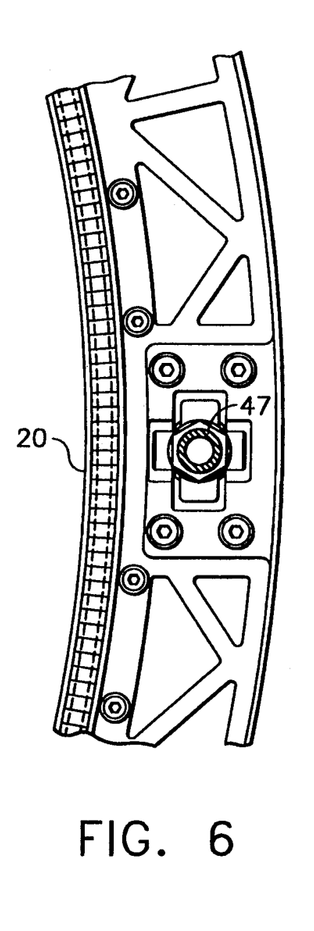
FIG. 6 is a partial view looking aft as taken along line 6—6 of FIG. 7.
Figure 7:
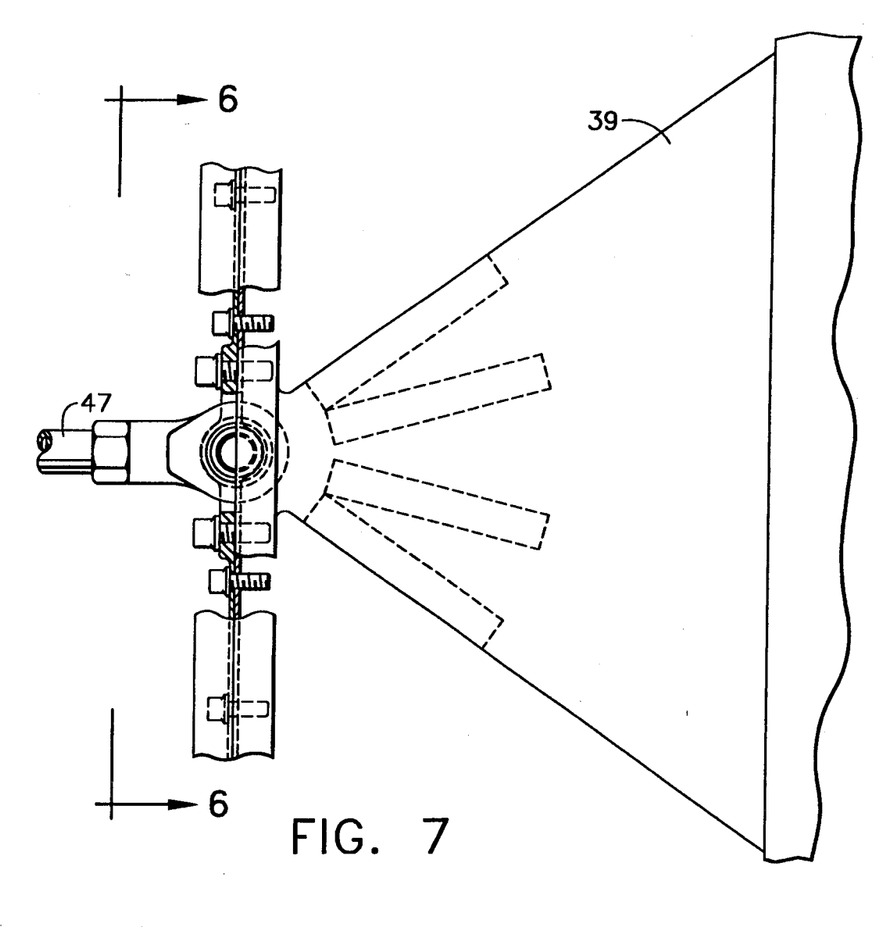
FIG. 7 is a view looking radially inwardly as taken along line 7—7 of FIG. 4.

As shown in FIGS. 4 and 5, four hydraulic cylinders 36 are equally circumferentially-spaced to interconnect the nozzle assembly 10 and the exhaust duct 12. As seen in FIGS. 6 and 7, the rod ends 37 of the hydraulic cylinders are connected to the spherical shell 20 by load distributing plates 39 so as to limit deflections in the spherical shell and thereby assure the effectiveness of the circumferential gas seal 24 (FIG. 3).

The cylinders 36 are hydraulically interconnected by continuous, substantially inflexible solid hydraulic pipes or tubes 38 so that any hydraulic fluid leaving one cylinder must enter the other cylinders. By this captured flow action, the nozzle assembly 10, to which all the hydraulic cylinders 36 are connected, is free to rotate under the action of the pitch and yaw actuators 16. The hydraulic tubes 38 do not have any flexible or universal joints which could leak and cause a fire safety problem in this very hot environment. Rather, tubes 38 are connected to cylinders 36 via substantially inflexible, fixed solid pipe joints.

In this manner, the four hydraulic cylinders serve as a hydraulic gimbal mounting for the nozzle assembly 10. The cylinders 36 change in length, some increasing and others decreasing, as hydraulic fluid flows between them under captured flow via hydraulic tubes 38. The cylinders are in normal operation pressurized only by the loading applied to them by the nozzle assembly 10.

So long as the gimbal cylinders do not leak swiveling or pivoting action of nozzle assembly 10 about pivot point 18 is assured. However, should a cylinder seal develop significant leakage, the pivot point would drift axially to the rear of the radial plane of bearing 22. This drift could ultimately result in unacceptable interference between the bearing 22 and the spherical shell 20. To prevent such interference and consequent high friction, which could interfere with vectoring actuation, a system is provided to offset any leakage that might occur.

The fact that the sum of the lengths of any two diametrically-opposed hydraulic cylinders 36 must be a constant, independent of vector angle, in the absence of seal leakage, is relied upon to make up any fluid leakage. The same principle is applied to the hydraulic pitch and yaw actuators 16 to maintain their proper actuation stroke lengths and stroke positions. That is, the sum of the lengths of the pitch actuator and yaw actuator is maintained constant.

This is accomplished by continuously monitoring the length of two opposite hydraulic cylinders 36 and the pitch and yaw actuators 16 by appropriate position transducers. If the sum of these measured lengths increases a set amount, i.e. approximately $\frac{1}{4}$ inch, an exhaust system hydraulic pump is triggered to add an appropriate amount of make up fluid to the interconnected cylinders at their rod ends. An additional pair of opposite gimbal cylinders 36 can be monitored independently to provide added assurance against rearward drifting of the nozzle pivot point 18.

Each pitch and yaw actuator 16 and each transducers 31 as shown in FIG. 4. Each transducer 31 may be of the linear voltage differential transducer variety (LVDT). An LVDT provides an electrical voltage which is proportional to its stroke position.

Each LVDT 31 includes a stationary outer coil mounted within each cylinder 16,36 and a movable rod and slug assembly which is attached to each cylinder rod 47. As the position of each cylinder rod 47 varies with stroke length, a proportional voltage signal is sent to a controller via wiring 49.

In the event that the controller detects a loss of hydraulic fluid based on a comparison of the position signals from the LVDT's, the controller activates a hydraulic pump driven by the engine gearbox. The pump then delivers hydraulic fluid from a hydraulic supply tank located on the engine casing to the cylinders 16,36 as required. In this manner, both the pitch and yaw actuators 16 and the hydraulic cylinders 36 are continuously calibrated within acceptable predetermined positions.

Conventional nozzle area actuators previously located on the exhaust duct 12 are not consistent with gimbal nozzle vectoring in general and especially not with hydraulic cylinder gimbal nozzle vectoring as described herein. To provide a compact, readily installable, vectorable nozzle having low transverse excursion for avoiding interference with the surrounding aircraft structure, the pivot point 18 must be as close to the nozzle discharge plane as possible.

This requirement dictates an axially compact nozzle and essentially precludes sufficient structure on which to mount conventional nozzle area actuators. Adding additional length to the exhaust duct 12 to provide space for the primary nozzle actuators would move pivot point 18 forward, and thereby necessitate a larger cut out in the adjacent aircraft structure to accommodate the gimbaled primary vectoring.

As seen in FIG. 4, eight circumferentially-spaced primary hydraulic actuators 40 are mounted directly to the divergent flaps 44 within nozzle cavity 42 defined between outer flap seals 34, outer flap 45 and the outer flaps 43. Four circumferentially-spaced secondary electrical actuators 41 are mounted directly to the convergent flaps. The actuators are thus completely contained within the nozzle assembly 10.

Electrical actuators 41 are used to vary the nozzle exit area insofar as the power required is sufficiently low to allow sufficiently compact and lightweight electrical actuators to be used. Moreover, an advantage of electrical actuators is that an electrical cable crossing the gimbal connection is simpler than using input and return hydraulic lines.

Although primary hydraulic actuators 40 are presently used because of the relatively high power required to rapidly move the primary flaps, it is possible to use electrical actuators for this function so as to eliminate the problem of hydraulic leaks and fires. It should be noted that the primary and secondary actuators 40,41 could be powered by high pressure air and thereby eliminate the fire safety hazard posed by hydraulic fluid. In practice, hydraulic, electric or pneumatic actuators could be used to power the primary and/or divergent nozzle flaps.

In prior exhaust nozzle designs, the primary nozzle actuators were mounted on the exhaust duct or "tailpipe" at a position forward of the primary nozzle. In these designs, the primary nozzle loads were transmitted into the fixed tailpipe. However, with a gimbaled nozzle, the gimbal assembly should be located just forward of the primary nozzle to maintain the pivot point 18 at the location specified above. Thus, the primary actuators 40 should be located aft of the primary nozzle.

By locating both the hydraulic primary nozzle area actuators 40 and the electric secondary nozzle area actuators 41 in the nozzle cavity 42 so as to act directly on the convergent and divergent flaps 43,44, not only are the actuators 40,41 removed from the exhaust duct area but large weight savings are made possible by the elimination of linkages extending between the exhaust duct 12 and flaps 43,44.

Figure 8:
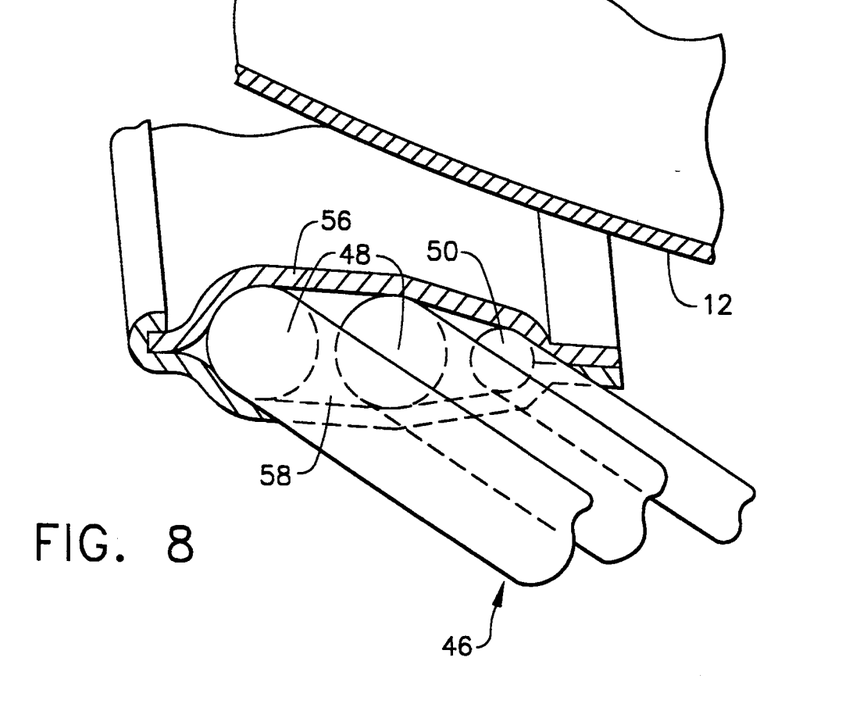
FIG. 8 is an enlarged sectional view of a flexible harness for controlling nozzle area actuators as taken from section 8 of FIG. 4.
Figure 9:
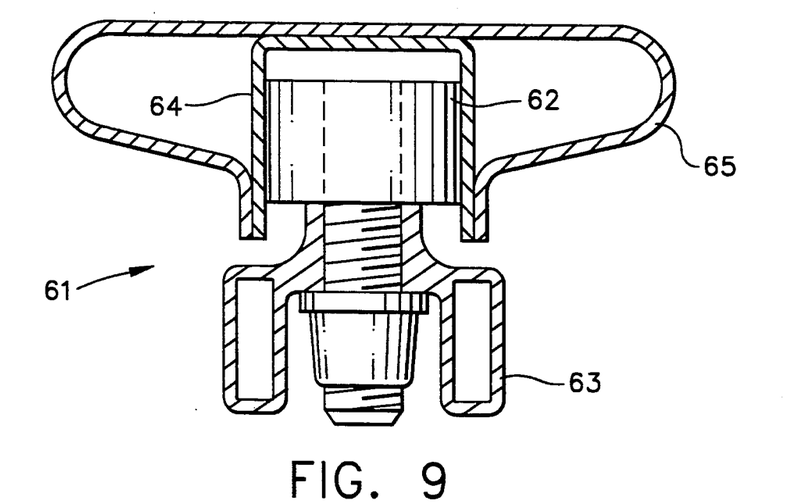
FIG. 9 is a sectional view taken through line 9—9 of FIG. 10.
Figure 10:
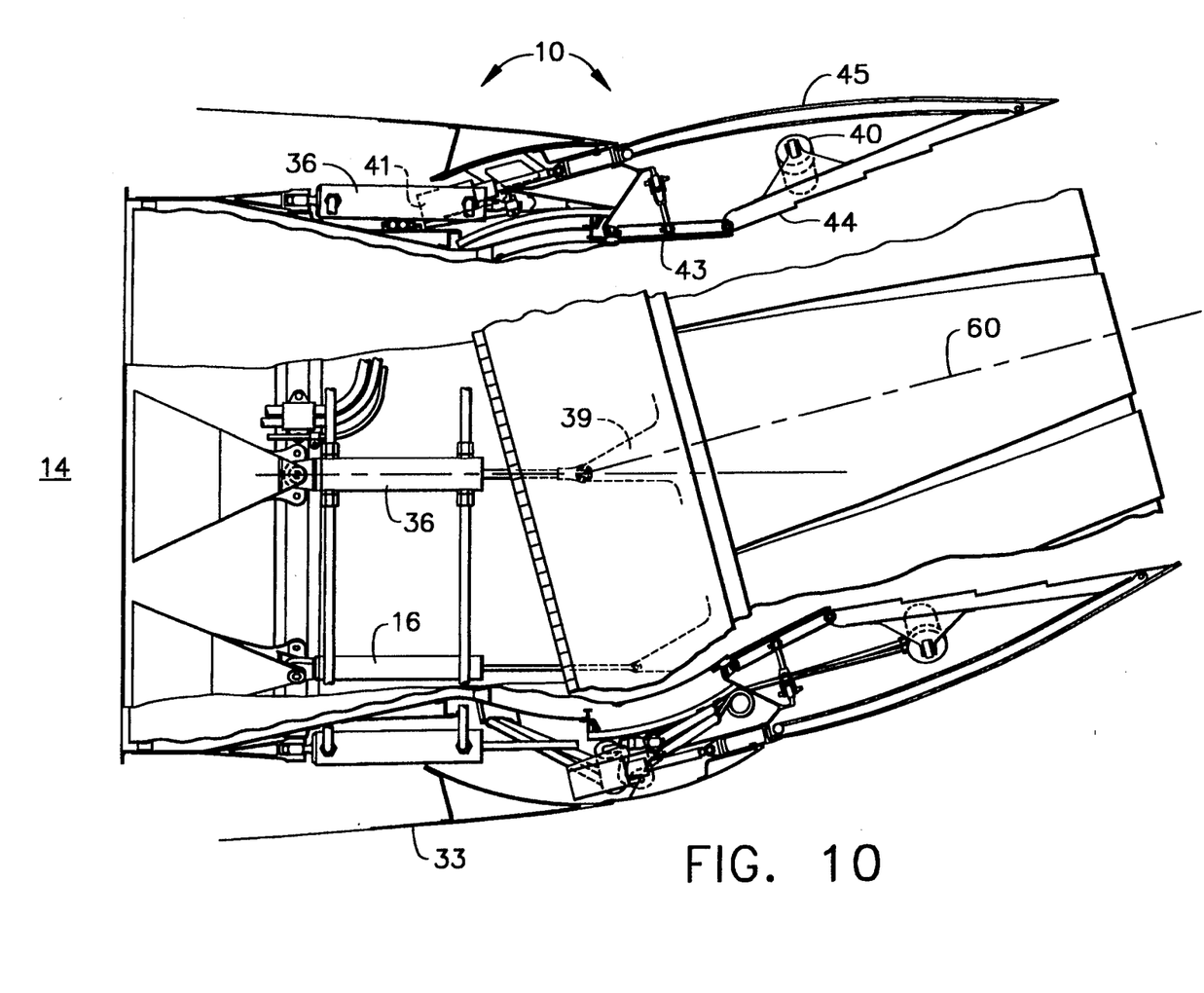
FIG. 10 is a view of the nozzle assembly of FIG. 4, showing details of an anti-rotation assembly with the nozzle assembly in a fully vectored position.
Figure 11:
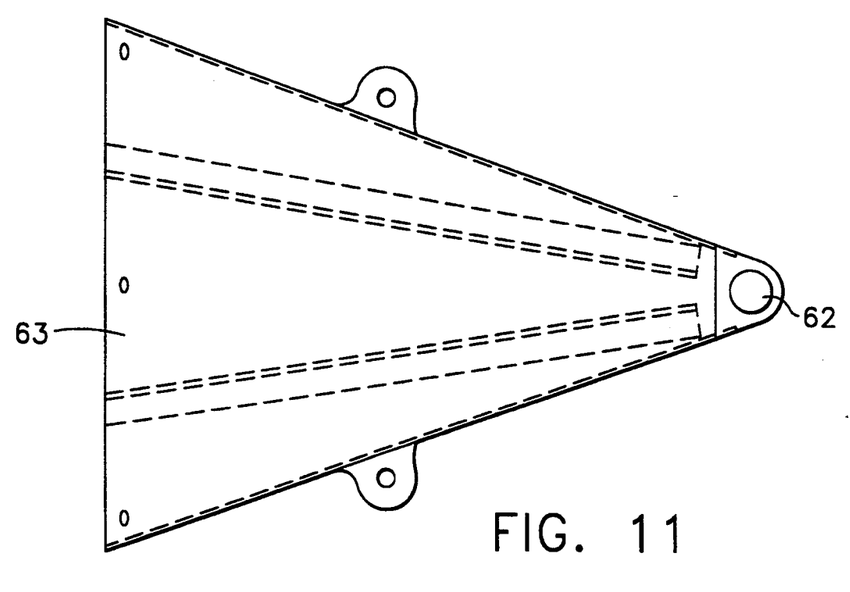
FIG. 11 is a view taken along line 11—11 of FIG. 10.
Figure 12:
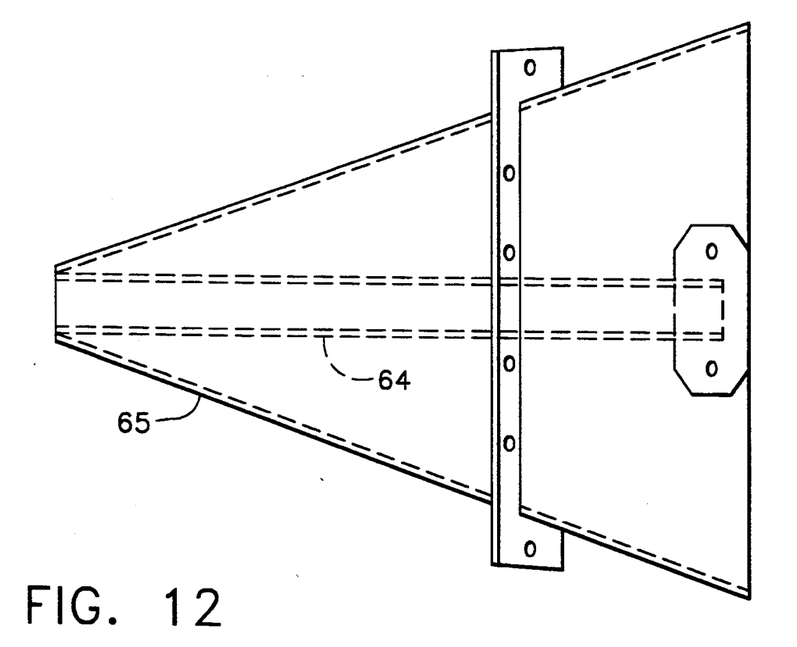
FIG. 12 is a view taken along line 12—12 of FIG. 10.

Special provisions are required for providing control line service between the primary nozzle area actuators 40 and a remotely located engine controller. As detailed in FIGS. 4 and 8, this is accomplished by use of a flexible harness 46 which includes two hydraulic tubes 48, not flex hose, and an electric cable 50 for feedback. Harness 46 is clamped at one end to the exhaust duct 12 via clamps 52. The flexible harness 46 then passes around the exhaust duct 12, approximately ¾ turn (270°) to provide the flexibility necessary to accommodate nozzle vectoring and terminates at an orthogonally arranged pair of rotary unions 54 which provides a hydraulic universal joint action.

Flexible lines such as those used in harness 46 are subject to vibration and wear. To avoid wear and vibration damage, the tubes 48 and cable 50 are encased in a protective sheath 56 as shown in detail in FIG. 8. Sheath 56 is filled with a visco elastic compound 58 such a silicone elastomer to provide vibration damping.

Although the large tension forces applied to the hydraulic cylinders 36 by the exhaust gases act to keep the cylinders oriented axially, it is possible for the nozzle assembly 10 to rotate circumferentially a small amount about its centerline 60. To prevent such rotation and consequent bending of cylinder hydraulic tubes 38, an anti-rotation assembly 61, details of which are shown in FIGS. 9 through 12 is provided between the nozzle assembly 10 and the exhaust duct 12.

The anti-rotation assembly includes a roller 62 mounted on a support member 63 attached to the exhaust duct 12. Roller 62 engages a track 64 provided on a support member 65 which is mounted on the nozzle assembly 10. As the nozzle vector angle varies, the roller 62 moves along the track 64 so as to allow vectoring while preventing rotation of the nozzle assembly 10 about its centerline 60.

By using hydraulic cylinders 36 to provide gimbal action without the weight and envelope problems of actual gimbal rings, and with the described system for correcting hydraulic seal leakage, a low weight, reliable, multi-axis thrust vectoring system is provided. In addition, as seen in FIG. 4, the use of nozzle area actuators 40,41 for nozzle area variation enhances compactness and aircraft installation compatibility. Both independently controlled, primary convergent nozzle area and divergent nozzle exit area are provided for maximum performance.

Figure 15:
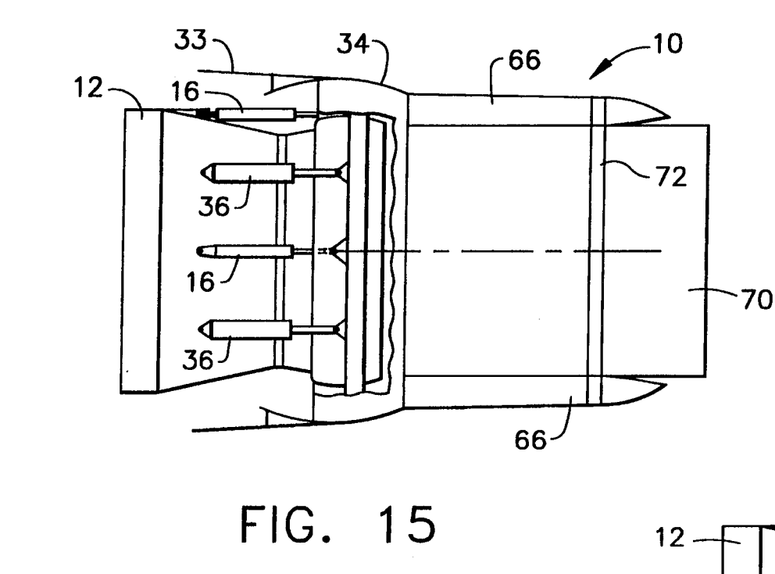
FIG. 15 is a top view of the nozzle of FIG. 13.
Figure 16:
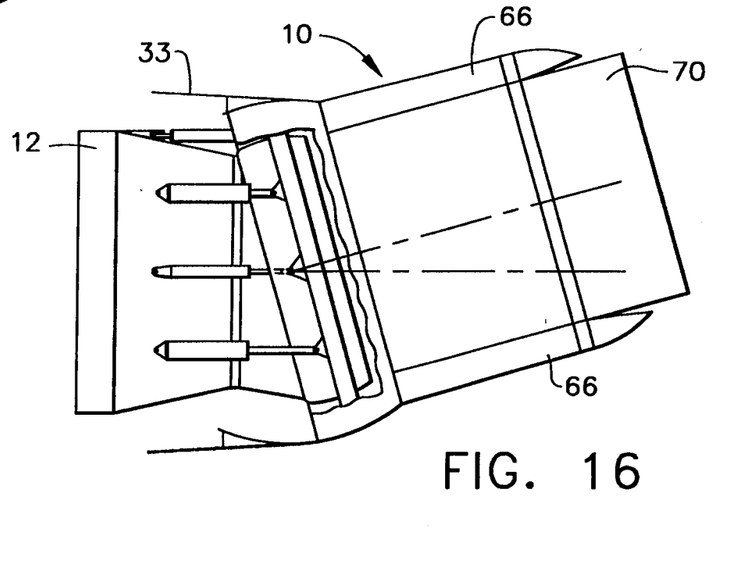
FIG. 16 is a view of the nozzle of FIG. 13 vectored sideward for yaw vectoring.
Figure 17:
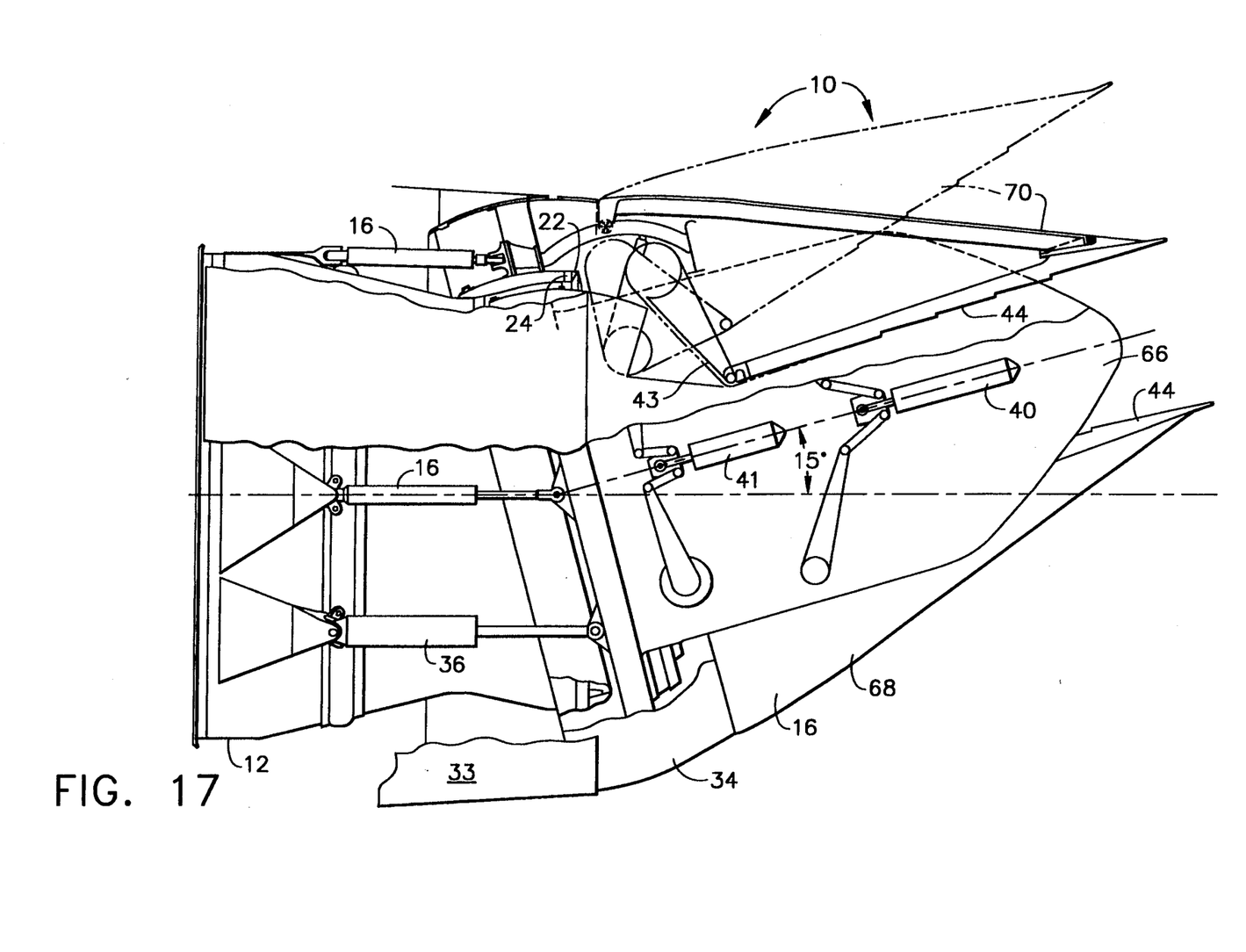
FIG. 17 is an enlarged detailed view of the nozzle of FIG. 14 in partial axial section.

The thrust vectoring described above in connection with an axisymmetric nozzle is also applicable to rectangular throat or two-dimensional nozzles as shown in FIGS. 13 through 17. All of the description and operation which applies to the axisymmetric nozzle vectoring of FIGS. 1 through 12 also applies to the two-dimensional nozzle vectoring with the exception of the nozzle area actuator location. The nozzle area actuators 40,41 are preferably located on the side walls 66 of the two-dimensional nozzle as shown in FIG. 17.

Figure 13:
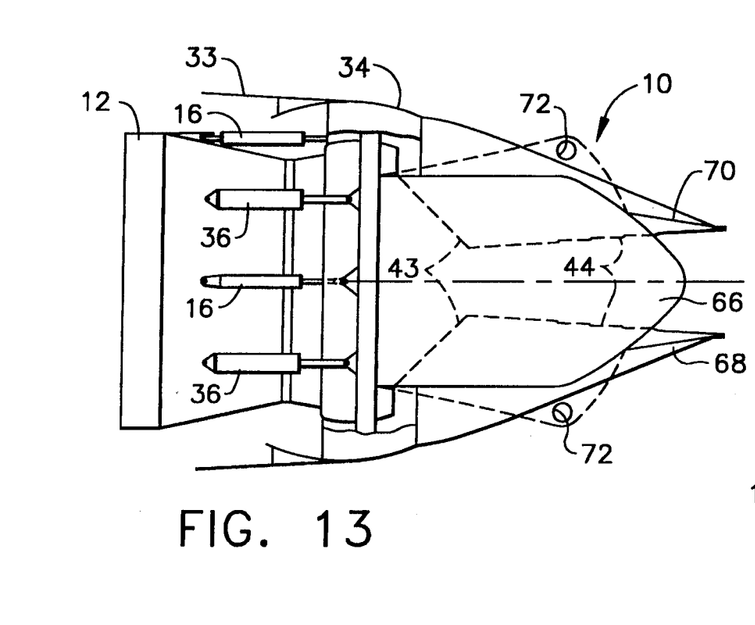
FIG. 13 is a schematic side view of a multi-axis, vectorable, two-dimensional, convergent-divergent exhaust nozzle according to an alternate embodiment of the invention.
Figure 14:
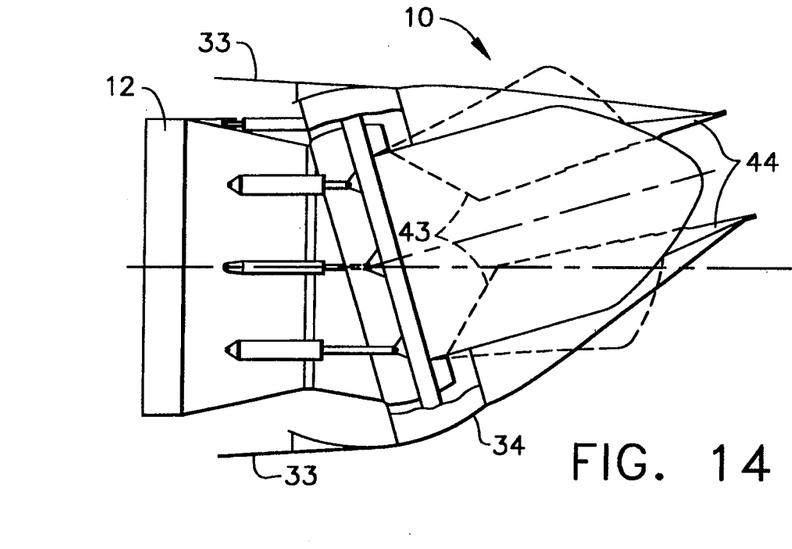
FIG. 14 is a view of the nozzle of FIG. 13 vectored upward for pitch vectoring.

As seen in FIGS. 13 and 14, the two dimensional convergent-divergent nozzle assembly 10 includes a pair of side walls 66, a lower flap 68 and an upper flap 70. If desired, additional structural rigidity may be added to the side flaps 66 by extending their contours as shown in phantom in FIG. 13 and interconnecting the side walls with upper and lower tie rods 72 as seen in FIG. 15.

Nonvectored exhaust is shown in FIGS. 13 and 15 while pitch vectoring is shown in FIG. 14 and yaw vectoring is shown in FIG. 16. In each position, the nozzle assembly 10 forms an aerodynamically smooth transition between the aircraft fairing 33 and the outer flap seals 34 so as to minimize aerodynamic drag.

Although four hydraulic "gimbal" cylinders 36 are shown in the figures describing this hydraulic gimbal concept, it should be noted that any number, three or greater, can be used. However, an even number functions best. The hydraulic gimbal vectoring can provide vectoring of any conceivable nozzle including fixed area or special purpose nozzles.

The four hydraulic gimbal cylinders 36 could be replaced by four actuators which could provide the axial nozzle force reaction which also could provide the gimbal action about pivot point 18 and which could further provide the vectoring actuation. However, this would require four separate control loops.

Figure 18:
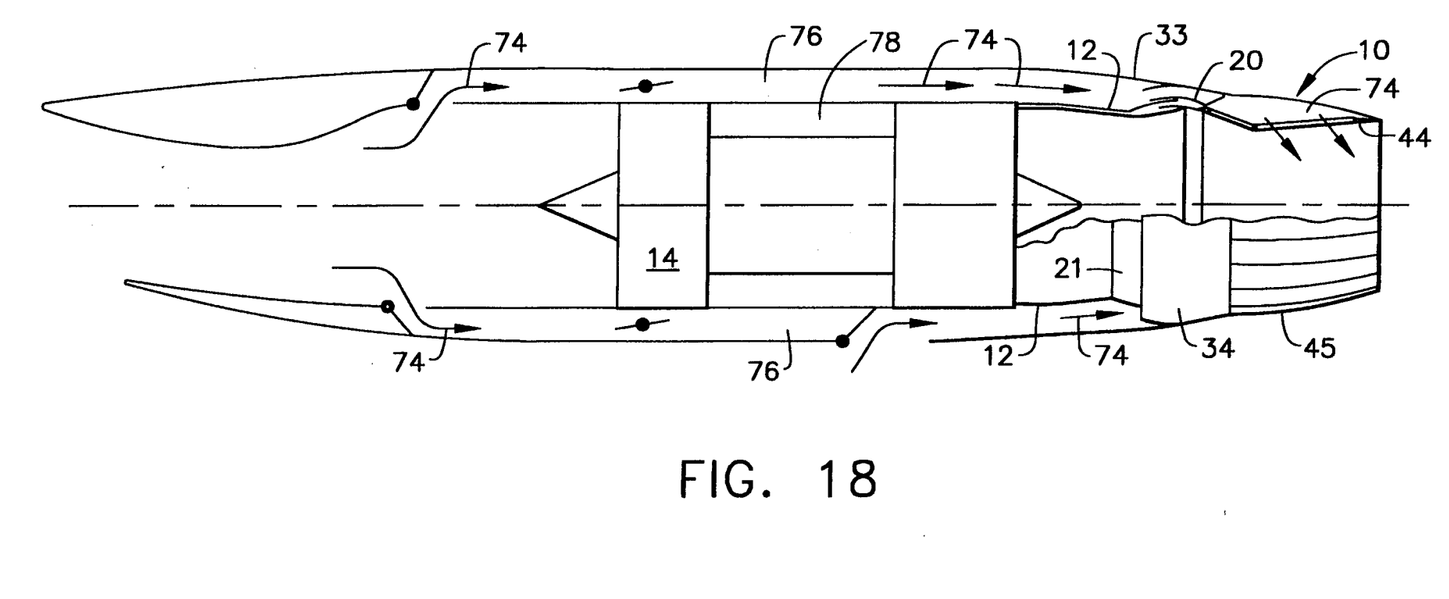
FIG. 18 is a schematic view in axial section of the flow of ram air through the nozzle in accordance with the present invention.
Figure 19:
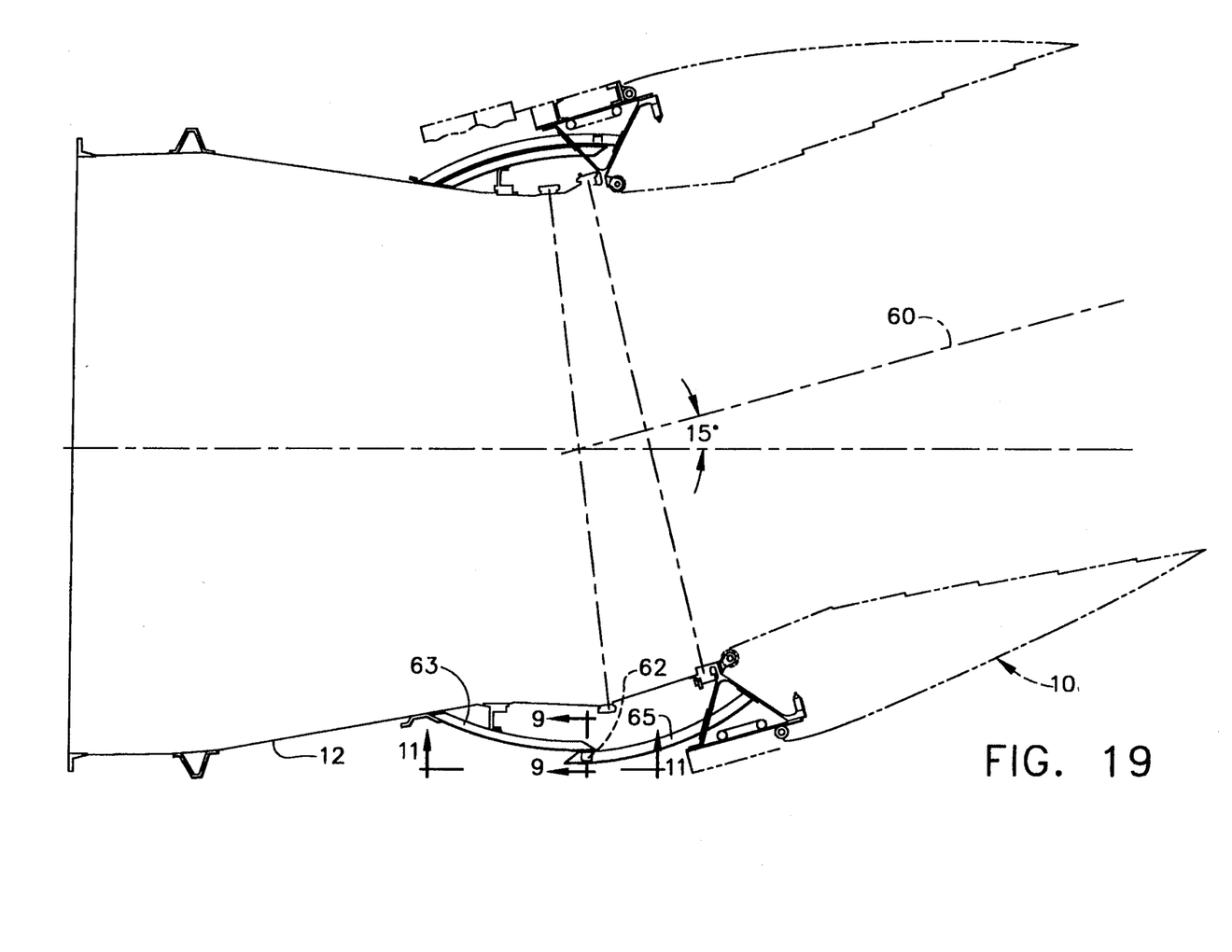
FIG. 19 is a view of the nozzle assembly of FIG. 10, showing details of an anti-rotation asssembly.

As further seen in FIGS. 1, 4 and 18, ram cooling air 74 is introduced into the nozzle assembly 10 via ram air bypass duct 76. Pressurized bypass air 78 may be channeled between exhaust duct 12 and liner 30 for additional cooling. The use of low pressure ram air 74 provides highly efficient cooling of the divergent flaps 44 without resorting to the use of higher penalty pressurized bypass air 78. Because only the convergent flaps 43 are substantially subjected to the loading caused by the exhaust gases being vectored, exhaust gas pressure against the divergent flaps is relatively low. This allows for cooling by ram air 74.

There has been disclosed heretofore the best embodiment of the invention presently contemplated. However, it is to be understood that various changes and modifications may be made thereto without departing from the spirit of the invention.

What is claimed is:

1. An exhaust nozzle assembly for a jet engine, comprising:
   an exhaust duct;
   a nozzle connected to said exhaust duct by a hydraulic gimbal means for gimballing said nozzle with respect to said exhaust duct, said nozzle comprising convergent primary flap means and divergent secondary flap means;
   said gimbal means comprising at least three hydraulic cylinders mounting said nozzle to said exhaust duct and having first end portions connected to said exhaust duct and second end portions connected to said nozzle;
   at least two nozzle actuators connected between said exhaust duct and said nozzle, said nozzle actuators being independently actuated for vectoring said nozzle about said exhaust duct;

a first fluid conduit hydraulically interconnecting said first end portions of said hydraulic cylinders;

a second fluid conduit hydraulically interconnecting said second end portions of said hydraulic cylinders;

primary nozzle actuator means mounted within said nozzle on said primary flap means; and secondary nozzle actuator means mounted within said nozzle on said secondary flap means.

2. The assembly of claim 1, wherein said gimbal means comprises four hydraulic cylinders and further comprising transducer means operatively associated with said cylinders for monitoring fluid leakage within said cylinders and pump means for supplying fluid to said cylinders in response to said transducer means.

3. The assembly of claim 1, wherein said exhaust duct comprises an aft end portion defining a first spherical surface portion, wherein said nozzle comprises a forward end portion defining a second spherical surface portion and wherein said second spherical surface portion is rotatably positioned adjacent said first spherical surface portion.

4. The assembly of claim 1, further comprising cooling means for diverting ram air through said divergent secondary flap means.

5. The assembly of claim 1, wherein each of said nozzle actuators comprises a hydraulic cylinder and further comprising transducer means operatively associated with each said hydraulic cylinder for monitoring fluid leakage within each said hydraulic cylinder.

6. The assembly of claim 5, further comprising pump means for supplying hydraulic fluid to each said hydraulic cylinder in response to said transducer means.

7. The assembly of claim 1, wherein said nozzle comprises a central axis and further comprising anti-rotation means mounted between said exhaust duct and said nozzle for preventing rotation of said nozzle about said central axis.

8. The assembly of claim 7, wherein said anti-rotation means comprises roller and track means extending axially between said exhaust duct and said nozzle.

9. The assembly of claim 3, further comprising an annular bearing extending between said first and second spherical surface portions for reducing sliding friction therebetween.

10. The assembly of claim 9, further comprising an annular seal extending between said first and second spherical surface portions for preventing the free passage of exhaust gas therethrough.

11. The assembly of claim 1, further comprising harness means mounted to said exhaust duct and communicating with said primary actuator means, said harness means comprising a pair of hydraulic lines and an electrical line for controlling said primary actuator means.

12. An exhaust nozzle assembly for jet aircraft, comprising:

an exhaust duct;

a nozzle assembly mounted downstream of said exhaust duct;

convergent flap means mounted within said nozzle assembly;

divergent flap means mounted within said nozzle assembly;

a ram air duct surrounding said exhaust duct for channeling cool ram air into said nozzle assembly and through said divergent flap means.

at least three hydraulic cylinders mounting said nozzle assembly to said exhaust duct, each of said cylinders mutually hydraulically interconnected by a pair of captured flow hydraulic circuits;

pitch actuator means interconnected between said exhaust duct and said nozzle assembly;

yaw actuator means interconnected between said exhaust duct and said nozzle assembly; and a swivel joint extending between said exhaust duct and said nozzle assembly.

13. The assembly of claim 12, further comprising an annular seal located within said swivel joint for preventing the passage of gas between said exhaust duct and said nozzle assembly.

14. The assembly of claim 12, further comprising an annular bearing located within said swivel joint for reducing sliding friction between said exhaust duct and said nozzle assembly.

15. The assembly of claim 12, wherein said nozzle assembly comprises a central axis and further comprising anti-rotation means extending between said exhaust duct and said nozzle assembly for preventing rotation of said nozzle assembly about said central axis.

16. The assembly of claim 15, wherein said pair of captured flow hydraulic circuits each comprises substantially fixed joints interconnecting said circuits with said cylinders.

* * * * *